Dec. 10, 1929.  E. K. BAKER  1,738,682
AUTOMOBILE TRACTION DEVICE
Filed March 28, 1924
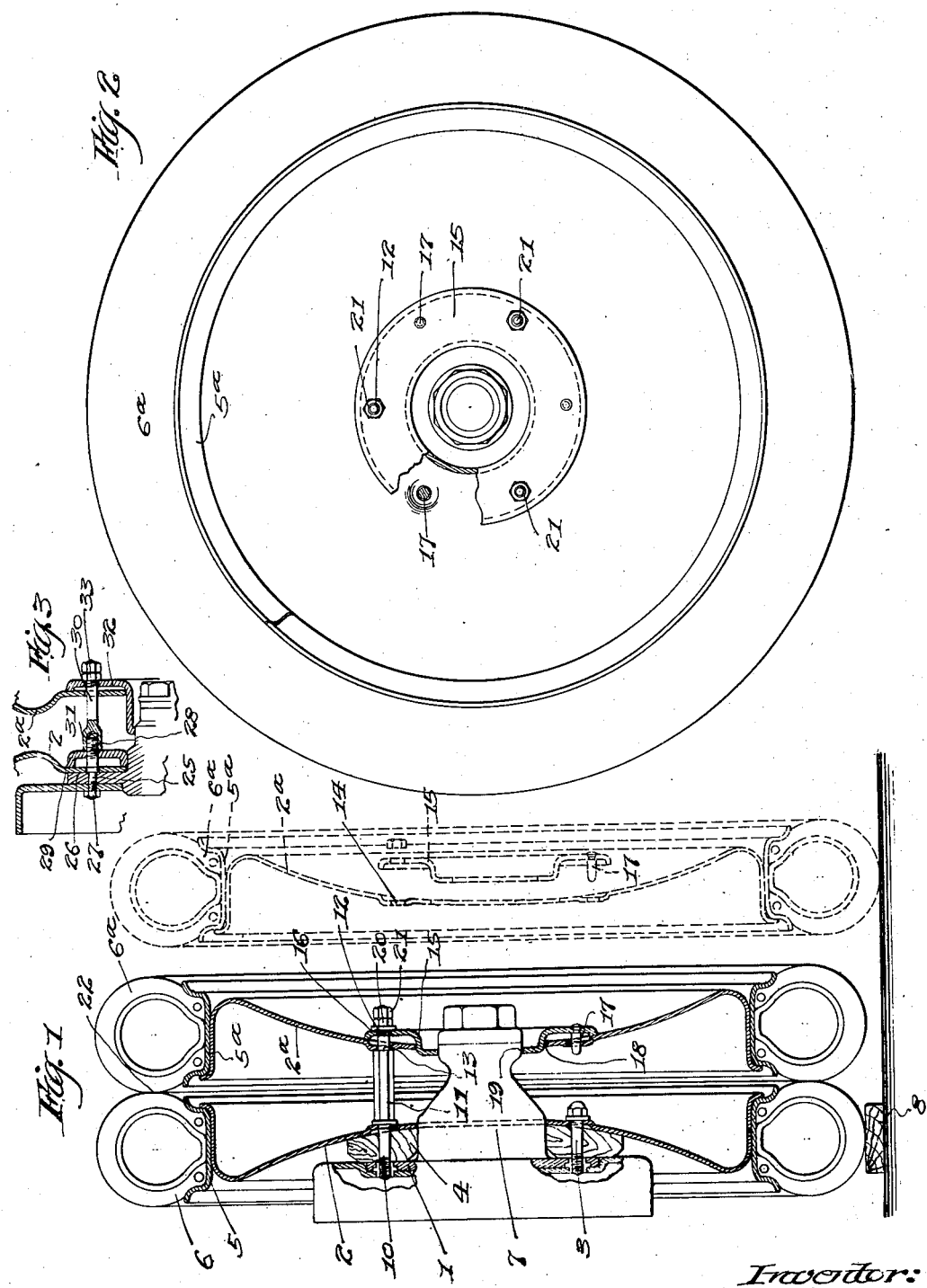
Witness:-
Earl E. Howe
Inventor:
Eric K. Baker
by Arthur M. Nelson Atty.

Patented Dec. 10, 1929

1,738,682

UNITED STATES PATENT OFFICE

ERLE K. BAKER, OF CHICAGO, ILLINOIS

AUTOMOBILE TRACTION DEVICE

Application filed March 28, 1924. Serial No. 702,617.

There are various times when the matter of traction in an automobile becomes a very serious one. For example, when driving upon wet, icy, muddy or other slippery pavements the lack of proper traction, particularly upon the rear or driving wheels is the cause of many very serious accidents. Furthermore the loss of control at such times places the driver under a very great mental strain, such as causes many people to refrain from using an automobile under such conditions, whereas in fact that is the very time when an automobile should be the most serviceable.

It is true that tire chains are used in such emergencies by many people, but there are a large number of people who forego the use of their cars rather than be subjected to the laborious task of applying chains and the annoying jangle thereof in use, with the possibility that, at almost any time, a cross chain will break so that the chain must be removed or it will be lost. Not only do chains present many serious objections, but they are not effective under all conditions to give the tractive effort that is needed properly to propel and guide the automobile. Furthermore tire chains are expensive and, unless very carefully applied, work great injury to the tires.

The object of my invention is to provide means whereby the necessary traction can be secured under all conditions of travel.

Another object of my invention is to provide means which can be simply applied by any one and without the necessity of jacking up the car.

It is also an object of my invention to provide means for giving the necessary traction and support to an automobile without injuring the tires and which shall be of such construction that skidding will be eliminated even upon very slippery pavements.

Again it is an object of my invention to provide means for the purpose referred to which shall be inexpensive to produce and which shall be of such construction that they will last almost indefinitely.

My invention consists generally in means of such form, arrangement, and having parts so co-acting with one another that the above named objects together with others that will appear hereinafter are attainable, and my invention will be more readily understood by reference to the accompanying drawings which illustrate what I consider, at the present time, to be the preferred embodiment thereof.

In said drawings:

Fig. 1 is a view, partly in elevation and partly in vertical section, of the driving wheel of an automobile equipped with a device embodying my invention.

Fig. 2 is an outer face view of the device of Fig. 1, part thereof being broken away, better to disclose the interior construction; and Fig. 3 is a sectional detail view illustrating a modified construction embodying my invention.

Referring now to Figs. 1 and 2 for the details of construction, 1 represents the hub flange and 2 a disc wheel which is secured to the said hub flange by a plurality of bolts 3, of which there are usually six in number, although there may be more or less. By means of the bolts 3, the wheel is bolted firmly to the filler block 4 and hub flange 1. The wheel 2 carries a rim 5 in which a pneumatic tire 6 is mounted. The parts thus far described are intended to be merely illustrative of a demountable wheel construction, so that they should be considered as by way of illustration and not by way of limitation.

Projecting outwardly from the hub flange is the hub barrel 7. 2ª represents a wheel similar to the wheel 2 and it carries a similar rim 5ª and tire 6ª. This wheel, under ordinary driving conditions, is carried as a spare wheel. If weather or road conditions make driving unsafe with the usual four wheels the spare wheel 2ª is attached to one of the rear or driving wheels, preferably to the rear left wheel, because in that position it is positioned upon the middle portion of the road.

To mount the wheel 2ª in a simple manner and without the use of a jack, I simply place a board 8 upon the ground and then drive the automobile so that the desired wheel rests upon the board, as shown in Fig. 1. I then remove alternate ones of the wheel holding bolts 3 and since six bolts are employed therefor as heretofore mentioned, it follows that three of such bolts would necessarily be removed. In place of the three bolts thus removed, I employ three special bolts 10 which are provided with an extension portion 11 and which terminate in a threaded outer end 12, which is larger than the end portion to form a shoulder. The spare wheel 2ª being in the position shown in the dotted lines of Fig. 1 (in this particular illustration it is reversed with respect to the wheel 2, but this is not always desirable, depending upon the shape of the wheel) it is moved axially toward the wheel 2. The three end portions 12 of the extension bolts are then entered into three alternate holes 14 of which there are six in the wheel 2ª and the wheel is then seated or engaged against the shoulder 13 of each portion 11 of said special bolts 10. This having been done, I apply what I shall term a radial spacing flange 15 which, as here shown, is provided with three holes 16 so spaced as to receive the three extension bolt portions 12 and with three locating pins 17 which enter the three remaining or intermediate holes in the wheel 2ª. The radial spacing flange 15 is provided with an annular shoulder 18 which forms a seat for the central portion of the wheel. The radial spacing flange 15, in turn, is provided with a central opening 19 so that it may be seated upon the barrel portion of the hub. The final assembly is completed by the three nuts 20 and the lock nuts 21, the lock nuts being merely an extra precaution.

It should be observed that when the wheel 2 and the auxiliary wheel 2ª are mounted, as described, the tires 6 and 6ª are substantially in contact as indicated at 22. This condition serves several very useful and important purposes. Being thus in contact the tires prevent the passage of mud, snow, water and foreign materials into the space between the two wheels, where it might otherwise find its way and which would be objectionable as it would impose an additional load upon the wheels. Furthermore such foreign material would not distribute itself evenly so that part of the wheel assembly would be much heavier than the remainder and this would set up a pounding action that would be objectionable and which would tend to rack and loosen the parts.

The mounting of the tires as described has a further advantage, in that a greater area of contact is made with the ground, which materially aids in preventing skidding.

The tires being clamped together in this manner the inner tire acts as a frictional drive to assist in driving the outer tire, thus relieving the bolts of some of the driving strain.

The use of the spare wheel at intervals in this manner actually aids in lengthening the effective life of the tire because it is well known that if a spare tire remains unused for a long period that it becomes lifeless and less resistant to the stresses and strains of use.

While the illustration shows a disc wheel, wheels of other types could be used.

In Fig. 3 there is shown a modification of my invention. Therein the normal wheel and auxiliary wheel have been given the same reference characters as before, to wit 2 and 2ª. In this instance, I have provided special bolts 25 which are held in the hub flange 26 by means of the nut 27, the outer end 28 of the bolt being enlarged to provide a shoulder. The outer end 28 is threaded and it projects through holes in the wheel and in the channel ring 29. In ordinary use a nut completes the assembly, the nut being screwed on the stud portion 28. When the spare or auxiliary wheel is to be attached a number, or all if desired, of the nuts are removed and extension devices 30 attached, the devices 30 being provided with socketed threaded portions 31 for that purpose. The outer ends of the devices 30 extend through holes in the auxiliary wheel and through holes in the radial spacing flange 32, the assembly being completed by the nuts 33. For some purposes, the construction of Fig. 3 may be preferred because it provides the fixed studs which need never be removed, the nuts only being removed when the auxiliary wheel is to be attached.

I claim:

1. A multiple disc wheel comprising a hub having spaced flanges, two independent disc wheel structures, a plurality of studs or bolts common to both of the independent disc wheel structures for securing the discs to the hub flanges and spacing means carried by the bolts for spacing the discs.

2. A multiple disc wheel comprising a hub having a radially extending flange and an auxiliary flange thereon, two independent disc wheel structures, a plurality of studs or bolts for securing the discs to the flanges, said bolts being supported at one end in the radially extending flange and supported at their other ends by said auxiliary flange.

3. A multiple disc wheel comprising a hub, a fixed flange at one end of said hub, a removable flange at the other end having an axial bearing on said hub, and independent demountable disc wheels supported respectively on said fixed and removable flanges by means passing through both of said wheels and flanges.

In testimony whereof, I have hereunto set my hand, this 25th day of March, 1924.

ERLE K. BAKER.